July 18, 1944. W. J. WEISSERT 2,353,777
TABLE-TOP CONSTRUCTION
Filed Oct. 17, 1941
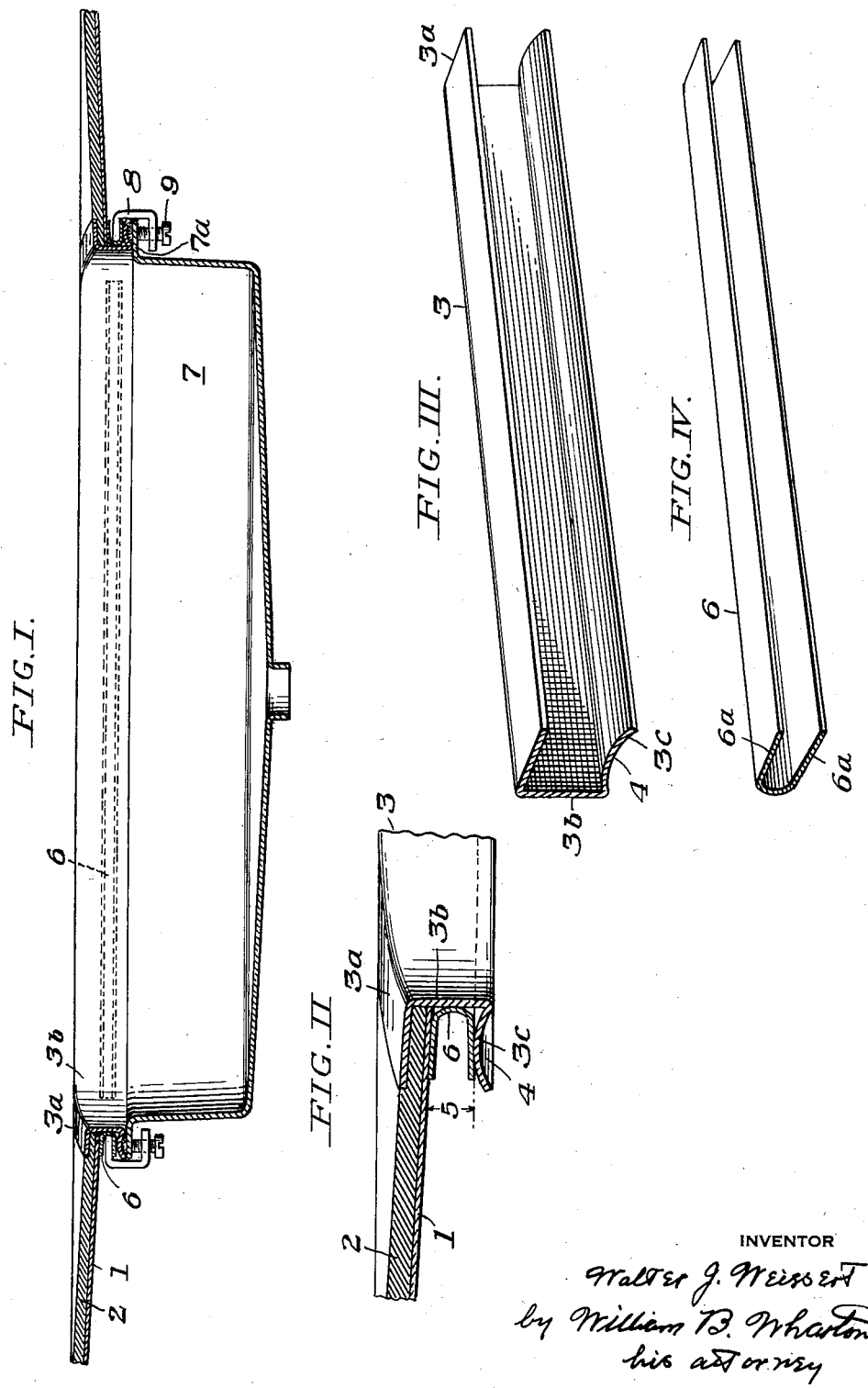
INVENTOR
Walter J. Weissert
by William B. Wharton
his attorney

Patented July 18, 1944

2,353,777

UNITED STATES PATENT OFFICE 2,353,777

TABLE-TOP CONSTRUCTION

Walter J. Weissert, Carnegie, Pa., assignor to The Tracy Manufacturing Company, a corporation of Pennsylvania Application October 17, 1941, Serial No. 415,399

3 Claims. (Cl. 311—107)

This invention relates to an edging construction which has particular applicability to sinks, but which may be used in connection with other articles of furniture such as desks, tables, chairs, benches, or the like, to edge that portion of the furniture structure which I herein generically term the "table-top."

Table-tops, as forming part of the structure of sinks, tables, and the like, are frequently made with a base of substantial rigidity which is composed of metal, plywood, wood, plastic composition, or other relatively unyielding substance, and a covering or facing of linoleum, oilcloth, leather, leatheroid, relatively yielding plastic, or other suitable facing material. In such composite structures it is very desirable that the facing should not only be cemented to the base by means of some suitable glue or cement, but also that the composite structure should be bound at its edge to give a finished appearance and to prevent the edge of the facing from curling away from, or otherwise detaching itself from, the edge of the base. It is thus common practice to apply a metallic edging in position to embrace the edge of the composite structure firmly to hold the edge of the facing to the edge of the base, and to give a generally attractive appearance and impression of thickness to the structure.

Such edging may have rigidity or resiliency in any desired order, and in accordance with the degree in which it is rigid or resilient it has been the practice to engage it to the structure composite of base and facing by means of screws, clamps attached to the base element of the structure, or by resilient engagement of the edging with some projected portion of the base itself, or a related structural element. Some force holding a portion of the edging against the upper facing is in fact necessary in order that the edging may perform its function of firmly integrating the composite structure at the edges of the base element and facing element of the structure.

It is the object of my invention to provide in a table-top assembly of the explained sort a simple and self-contained organization of an edging for the composite table-top and means for holding the edging firmly upon the facing of the composite structure of the table-top.

In the accompanying drawing

Fig. I is a vertical sectional view through an assembly in which a table-top, composed as above described, is edged in accordance with my invention at the opening through the table-top at which a sink basin is applied, the illustrated assembly thus being that of a sink construction.

Fig. II is a sectional detail view fragmentarily showing the composite table-top structure together with the edging and fastening means therefor, formed and arranged in accordance with my invention.

Fig. III is an isometric view of a fragmentary piece of the strip forming the primary element of the edging structure looking into the cavity thereof.

Fig. IV is a similar view of the locking and tightening element which is associated in assembly with the edging strip.

Referring to the drawing, the body structure of the table-top is composed of a relatively rigid sheet or plate 1, which, as above-noted, may be of metal, plywood, wood, relatively rigid plastic composition, or other suitable material. On the base 1 there is a facing 2, which as above-noted, may be of oilcloth, leather, leatheroid, or suitable relatively yielding plastic composition, but which in accordance with preferred practice is linoleum of one of the better grades. The facing 2 is usually cemented to the base 1 by some suitable adhesive. At the edge of the composite structure thus formed I mount an edging strip designated generally by reference numeral 3. As shown in Figs. I and III of the drawing, the facing is of substantial thickness, as is usual when a linoleum facing is used. As shown, the facing is rabbeted inwardly from its edge a width equal to that of the upper flange 3a of the edging strip and for a depth equal to the thickness of the edging strip flange, so that the upper surface of the flange 3a lies flush with the surface of the table-top facing.

This is desirable practice when the facing is of substantial thickness because the appearance of the assembly is improved if the upper surface of the facing and the upper surface of the edging strip flange are flush; and if the structure be incorporated in a sink, this flush positioning is of increased importance because it avoids the presence of a ledge by which moisture would be retained on the table-top. It is to be understood, however, that if the facing be of relatively thin material, such as oilcloth, or leatheroid, the same result may be attained by offsetting the material of the base and the facing which it carries downwardly for a width inwardly from the edge of the structure equal to the width of the upper flange of the edging strip to provide a ledge having the thickness of the edging strip.

Considering now specifically the edging strip 3, such strip is of a general channel shape having an upper or outer flange 3a, a base or skirt 3b, and an under flange 3c. As shown, the under flange 3c is bowed toward its opposite flange 3a to provide exteriorly a pocket 4 in which packing material may be placed if the table-top forms part of a sink assembly, or if for other reason it is desired to provide a seal at the lower flange of the edging strip. Such bowed structure is also generally desirable as tending structurally to stiffen the edging strip. Desirably the edging strip is formed of some ornamental metal, such as stainless steel, Monel metal, or the like, and is of such gauge and composition as to possess substantial stiffness. While metal is the preferred material for the edging strip, any other material, which is of pleasing appearance, which is susceptible to shaping into channel form, and which possesses relatively great strength and stiffness, may be used.

With the edging strip so mounted that its upper or outer flange 3a lies on the facing 2 of the table-top, the base or skirt 3b of the edging conceals the edge of the composite material forming the table-top proper, and it will be noted that the base or skirt 3b is of such width that the under flange 3c is spaced a substantial distance from the under surface of the table-top base 1. This space 5 I utilize firmly to engage the edging strip with the primary structure of the table-top, and to hold the outer flange of the edging strip firmly against the table-top facing. The means I employ for this purpose consists of a continuous or interrupted strip 6 of light gauge metal which is relatively more resilient than the material of which the edging strip is formed. The metal of the strip 6 is bent into substantially U shape with the wings 6a of the strip slightly divergent from each other, and with the distance between the edges of the strip slightly greater than the distance between the under surface of the table-top body and the flange 3c of the edging strip. In assembly I force the resilient U-shaped strip, or strips 6 bight-first into the space 5 between the base 1 and the under flange 3c of the edging strip, and in this insertion tend so to force the edges of the strip wings toward each other that the strip is placed under compression and exerts a continuous expansive force between the under surface of the base 1 and the upper surface of the flange 3c. This resilient force holds the edging strip 3 firmly in position, and tends to pull the upper or outer flange 3a of the edging strip down upon the edge of the facing 2. The U-shape strip 6 thus forms a resilient locking bar integrating the edging strip with the composite primary structure of the table-top.

It will be seen that the edging structure is self-contained, and that the smooth upper surface of the edging need not be deformed by the use of screws, or other locking means, to draw the flange 3a firmly against the facing or to integrate the edging with the body of the table-top.

Referring now particularly to Fig. I of the drawing in which the table-top forms part of a sink assembly, a sink basin 7 is arranged with its flange 7a lying against, and held to, the under flange 3c of the edging strip. The flange of the basin may be engaged to the flange of the edging strip in any suitable manner the means shown being a U-shaped clamp 8, having one leg inserted into the cavity of the locking bar, and having a set screw 9 passing through its other leg and bearing against the under surface of the basin flange. The edging strip may also similarly be used for the suspended mounting of dish washers, waste receptacles and other structures below the upper surface of the table-top.

As used to edge an opening of such sort, the locking strip may be made as a split ring suitably dimensioned to engage substantially around the opening, or may be made of separate pieces inserted at the several sides of the opening. When used on the exterior edges of a table-top incorporated in an ordinary table, desk, chair, or the like, the edging strip also may be made either as a split ring or made up of a plurality of individual pieces. It is necessary merely that it be made of metal of such gauge and resiliency, and that it be so dimensioned that it is capable of insertion between a flange of the edging strip and the base of the table-top, to exert sufficient resilient force firmly to lock the edging strip in position and to hold its upper flange firmly against the surface of the table-top proper in a region adjacent its edge.

It will readily be understood that the structure above-described is particularly neat in appearance, and is also particularly well adapted for shipment and for assembly with the other elements included in the complete sink or other like article of furniture in the assembly of which it forms an element. Even though the table-top to which the edging is applied is a single piece rather than a composite structure, an edging strip integrated with the edge of the table-top in the manner described is useful from an ornamental viewpoint, by finishing off the edge of the table-top and by imparting to the table-top the appearance of substantial thickness.

I claim as my invention:

1. A self-contained edge-bound table-top construction for inclusion in sinks and like articles of furniture consisting essentially of a body structure composite of a relatively unyielding base and a relatively yielding facing thereon, a channel-shape edging strip embracing an edge of the said body structure with its outer flange in contact with an edge region of the said facing and with its under flange spaced from the said base, and a U-shaped resilient metallic locking bar forced bight-first into the space between the base of the table-top body structure and the under flange of the edging strip, by its expansive force to integrate the edging strip with the body structure of the table-top and to press its upper flange against the facing thereof.

2. A self-contained edge-bound table-top construction for inclusion in sinks and like articles of furniture consisting essentially of a relatively unyielding body structure, or base, a channel-shape edging strip embracing an edge of the said body structure with its outer flange in contact with an edge region on the outer surface thereof and with its under flange spaced from the said body structure, and a U-shaped resilient metallic locking bar forced bight-first into the space between the under surface of the table-top body structure and the under flange of the edging strip by its expansive force to integrate the edging strip with the body structure of the table-top.

3. A self-contained edge-bound table-top construction for inclusion in sinks and like articles of furniture consisting essentially of a relatively unyielding body structure, or base, a channel-shaped edging strip embracing an edge of the said body structure with its outer flange in contact with an edge region on the outer surface thereof and with its under flange spaced from the said body structure, and a resilient metallic locking strip compressed within the space between the base of the body structure and under flange of the edging strip, the said strip comprising a pair of spaced contact flanges arranged in superposed relation in the assembly and a web connecting the said flanges, the said flanges being resiliently urged into relatively extended face to face frictional contact with opposed regions of the base structure and under flange of the edging strip, the said locking strip web being spaced inwardly from the edge of the said under flange of the edging strip to provide clearance for hanger clamps entered between the flanges of the locking strip.

WALTER J. WEISSERT.